United States Patent [19]
Stonebraker et al.

[11] 3,804,207
[45] Apr. 16, 1974

[54] LIFTING ATTACHMENT FOR LIGHTWEIGHT VEHICLES

[76] Inventors: William J. Stonebraker, 400 Belmont Ave.; Leroy C. Brashers, Jr., 100 Robert Ln., both of Bakersfield, Calif. 93308

[22] Filed: Dec. 9, 1970

[21] Appl. No.: 96,542

[52] U.S. Cl.......................... 187/9, 182/68, 182/103
[51] Int. Cl................................................. B66b 9/20
[58] Field of Search............ 187/9, 10, 11; 212/8, 9; 214/75, 75 T; 182/68, 103

[56] References Cited
UNITED STATES PATENTS

| | | | |
|---|---|---|---|
| 2,241,275 | 5/1941 | Shinn et al...................... | 182/103 X |
| 2,586,531 | 2/1952 | Gordon............................. | 182/68 X |
| 3,374,901 | 3/1968 | Ferwerda........................... | 187/9 X |
| 2,711,803 | 6/1955 | Hurst.................................. | 212/8 |

Primary Examiner—Evon C. Blunk
Assistant Examiner—H. S. Lane
Attorney, Agent, or Firm—Vergil L. Gerard

[57] ABSTRACT

This lifting attachment is adapted for mounting on a pickup truck. When stowed it is carried on a ladder rack on the vehicle, and when in use it is mounted on the vehicle trailer hitch. The attachment is designed for lifting weights up to 500 pounds to the height of a two story roof. The attachment consists of a boom mounted on the ladder rack by a boom carriage which is movable horizontally to carry the boom from its stowed position horizontally at rest on the ladder rack, to its use position where it can be tipped vertically and attached at its lower end to the trailer hitch of the vehicle. A lift carriage is mounted on the boom and driven up and down by means of a cable and winch, to accomplish the lifting.

8 Claims, 10 Drawing Figures

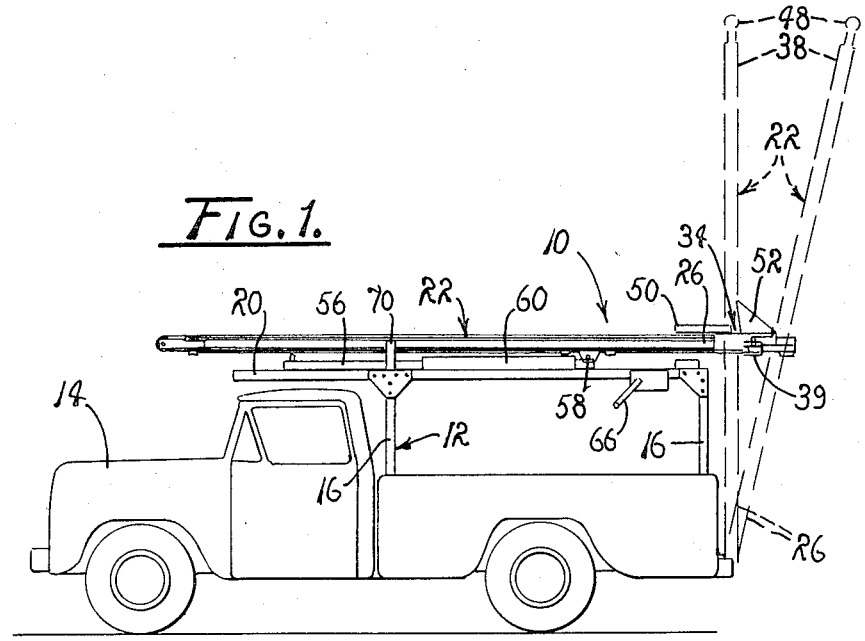
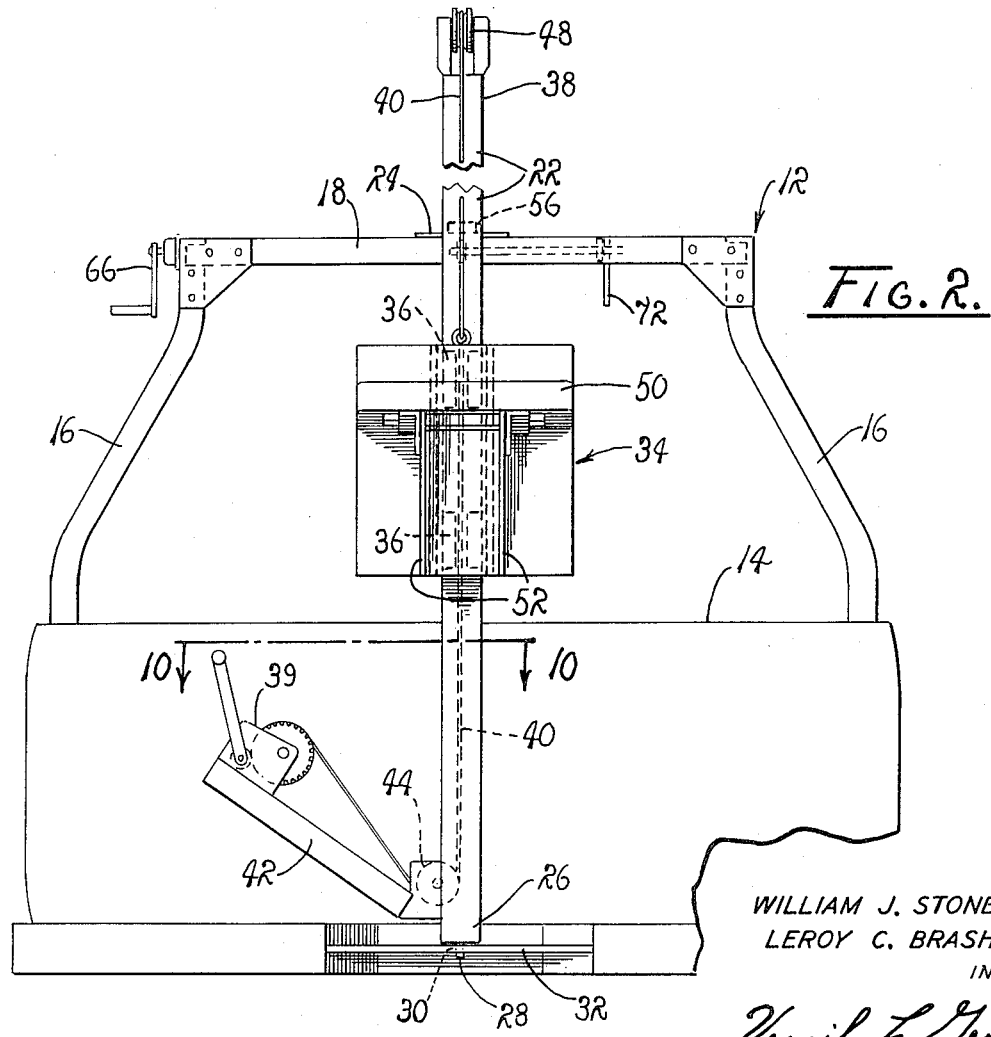

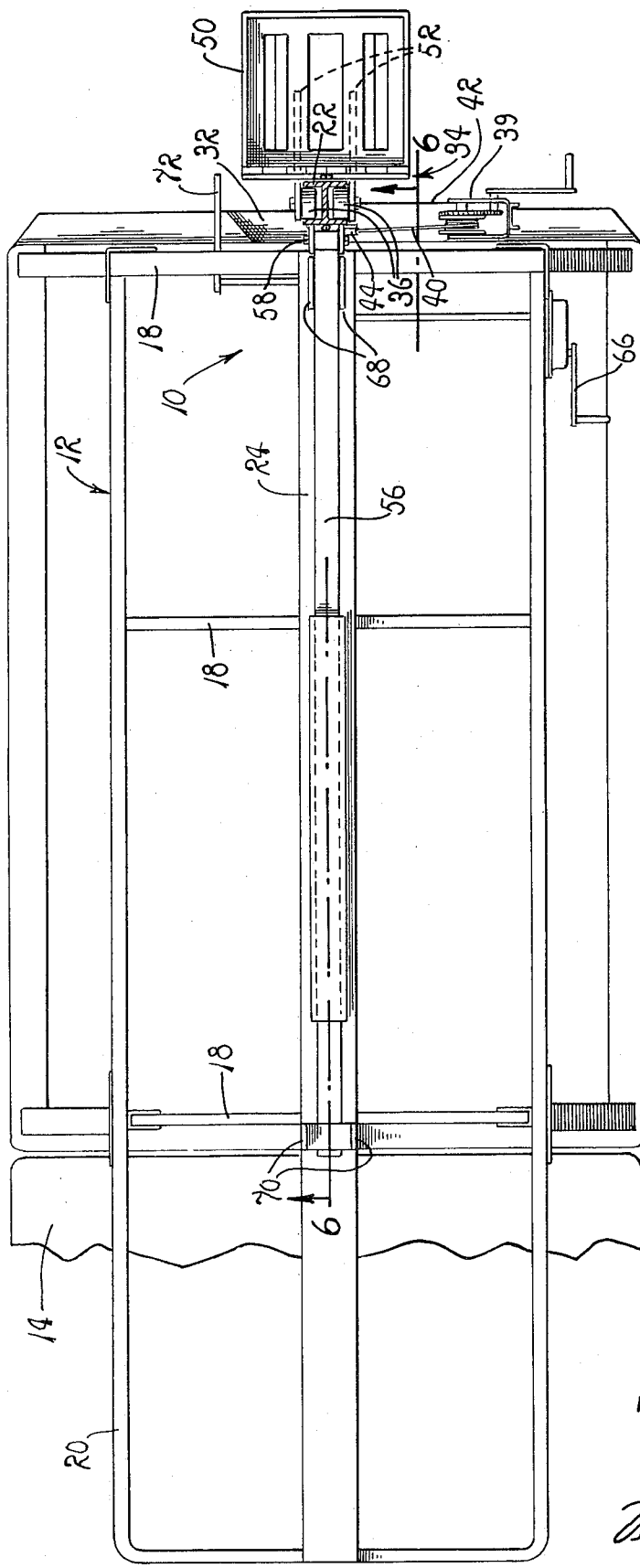

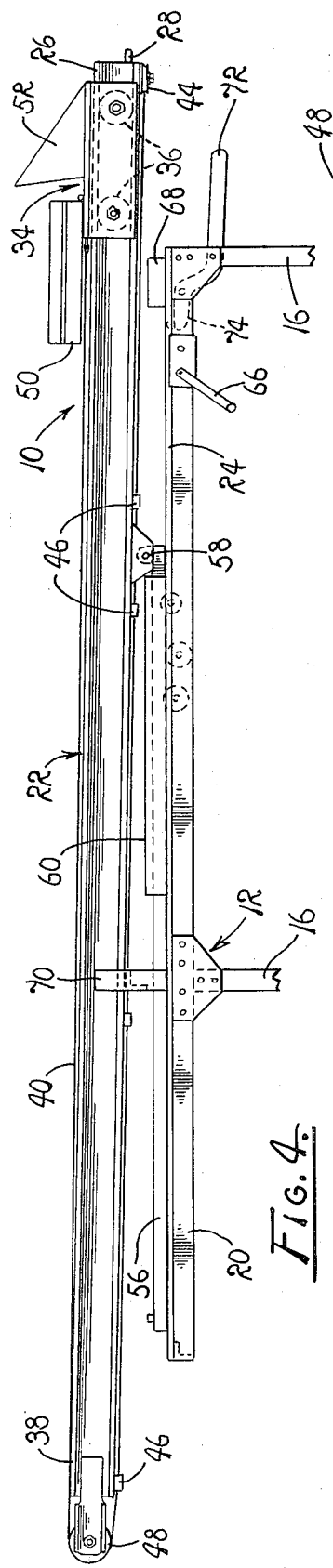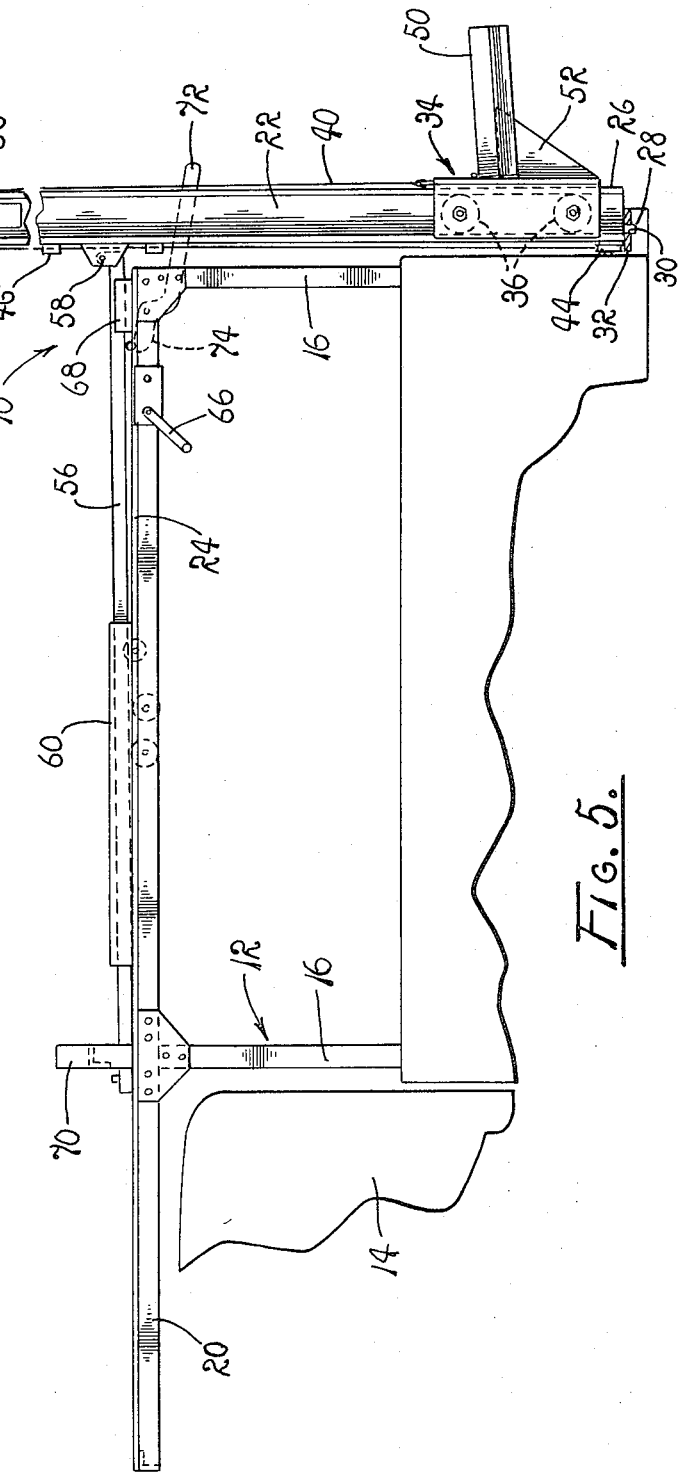

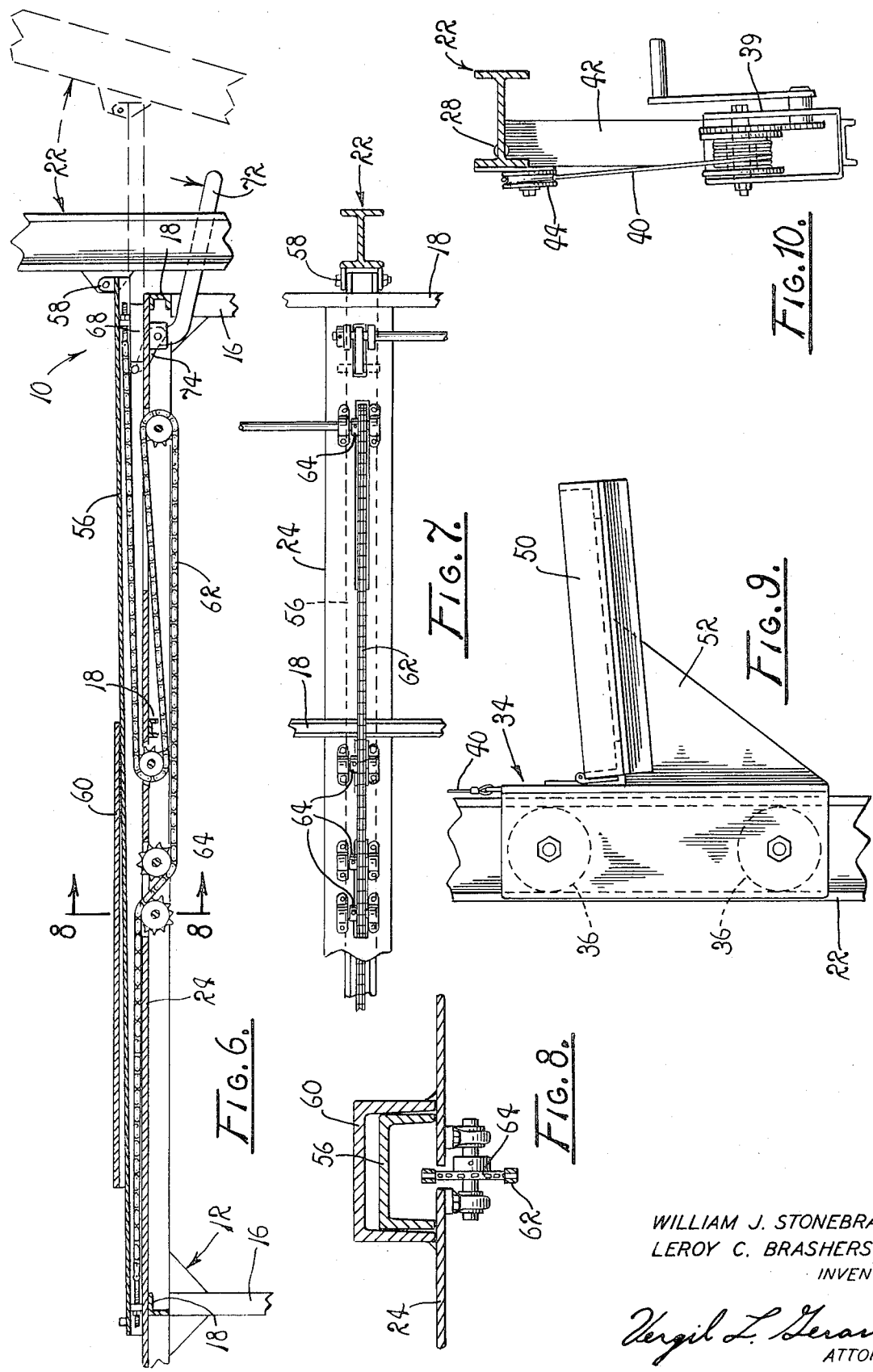

LIFTING ATTACHMENT FOR LIGHTWEIGHT VEHICLES

BACKGROUND OF INVENTION

This invention relates generally to lifting devices, and more particularly to a lifting attachment for lightweight vehicles capable of lifting relatively light weight apparatus to heights of one and two stories.

In the construction of homes and apartments it is frequently convenient to lift weights of 100 to 500 pounds to the roof level. Generally, the only vehicles available to the workmen on such jobs are pickup trucks or similar light haul vehicles. Since these vehicles presently are not provided with any lifting facilities and the cost of acquiring special lifting equipment such as cranes, work elevators or "cherry pickers" are prohibitive for this type construction, the lifting must be done by hand, sometimes with the aid of a made up lift frame.

A typical example of this problem is the difficulty faced in the installation of air conditioning where lifting the compressor unit to a roof top is required. These units generally weigh 200 to 300 pounds and are brought to the job site in a pickup truck. Often only one man is available for lifting them onto the roof for installation, and the lifting must be done by a man "walking" the apparatus up a ladder or by sliding it up the ladder by use of a roof attached block and tackle. Both of these methods are strenuous, dangerous, and time consuming.

The need, therefore, exists for an inexpensive lifting device attachable to pickup trucks and similar light haul vehicles which can lift loads of the magnitudes mentioned to a one or two story rooftop level.

It is, therefore, a major object of our invention to provide a lifting attachment for light haul vehicles capable of lifting weights up to 500 pounds to a one or two story roof top.

It is a further object of our invention to provide a lifting attachment of the type described which is stowable on the ladder rack of the vehicle when not in use and is mountable on some accessible portion of the vehicle chassis such as the trailer hitch, when in use.

It is also an object of our invention to provide a lifting attachment of the type described which can be inexpensively manufactured and easily adapted to many different types of vehicles.

These and other objects and advantages will become more readily apparent from the following detailed description of a preferred embodiment of our invention and the accompanying drawings in which:

FIG. 1 is a side elevational view showing our invention mounted on a pickup truck;

FIG. 2 is a rear elevational view showing the lifting attachment of our invention in its vertical position ready for lifting;

FIG. 3 is a plan view showing the lifting attachment in its vertical position for lifting;

FIG. 4 is an enlarged partial side elevational view showing our lifting attachment in its stowed position on the ladder rack of the pickup truck;

FIG. 5 is an enlarged partial side elevational view showing our lifting attachment associated with the ladder rack of a hauling vehicle and in its upright or lifting position;

FIG. 6 is an enlarged, partial sectional side elevational view taken on line 6—6 in FIG. 3 showing the mechanism for moving our ligting attachment from its stowed to its lifting position;

FIG. 7 is an enlarged, partial bottom view of the apparatus shown in FIG. 6;

FIG. 8 is an enlarged, partial sectional end view taken on line 8—8 in FIG. 6;

FIG. 9 is an enlarged, partial side elevational view of the lifting carriage and plaform on my lifting attachment; and FIG. 10 is an enlarged sectional view taken on line 10—10 in FIG. 2 and showing the winch and cable for driving the lifting carriage on our lifting attachment.

Referring now to the drawings, and particularly FIG. 1 thereof, we show our lifting attachment 10 mounted in its stowed position on the ladder rack 12 on a pickup truck 14. The ladder rack 12 is supported on the pickup truck at the four corners of the truck bed by uprights 16 and forms an elevated ladder bed above the truck bed by means of cross members 18 and an over cab support frame 20.

Our lifting attachment 10 consists of a boom 22 which has a height substantially equal to the length of the truck and is preferably formed of steel I-beam structure. In its stowed position, the boom 22 rests on a longitudinally disposed support frame 24 which is mounted on the ladder rack cross members 18 and the over-cab support frame 20 (see FIG. 3). The support frame 24 is centered with respect to the truck body to comply with highway requirements and avoid any unbalancing of the vehicle.

At its lower end 26 the boom 22 has an anchor pin 28 which fits in a hole 30 of a trailer hitch frame 32 on the back of the truck, when the boom is placed in its generally vertical lifting position (see FIG. 2).

A lift carriage 34 is mounted on the boom by means of rollers 36 and is movable from the lower end 26 of the boom to its upper end 38. To move the lift carriage, a winch 39 and cable 40 are provided. The winch 39 is attached by means of a winch support arm 42 to the lower end 26 of the boom and the cable 40 passes around a lower pulley 44, up the back side of the boom, through two cable guides 46, over a top pulley 48 rotatably mounted in the top of the boom, and down the front side of the boom to the lift carriage 34.

The lift carriage 34 has a lifting platform 50 which is hinge mounted to the lift carriage for pivotal movement from a stowed position flush against the boom to a support position normal to the boom. Platform support flanges 52 are provided on the lift carriage 34 which extend outwardly to support the lifting platform 50 when it is swung to its lifting position, normal to the boom.

The lift carriage 34 travels from the lower end 26 of the boom to the upper end 38 when the cable 40 is winched in over the pulley system by the winch 39, thereby carrying loads placed on the lifting platform 50 from truck bed level to the top of the boom.

To secure the upper portion of the boom 22 to the pickup truck, and to provide means for moving the boom from its generally vertical, lifting position to its generally horizontal stowed position, a boom arm 56 is provided which is connected to the boom approximately midway of its length by pivotal connection 58. The boom arm 56 travels in a sleeve 60 mounted on the boom support frame 24, and is driven reciprocally with respect to the support frame by a chain 62. The chain 62 is attached to each end of the boom arm 56 and passes over pulleys 64, one of which is manually driven by a hand crank 66.

To prevent side to side movement of the boom arm 56 when it is extended rearwardly on the boom support frame 24, lateral guides 68 are provided near the rear end of the boom support frame which project upwardly on each side of the boom arm.

To assure continued alignment of the boom 22 on the support plate 24, when the boom is in its generally horizontal stowed position, a forward mounting guide 70 is provided with "V" shaped edges which direct the upper end of the boom into the guide.

A cam lever 72 is pivotally mounted on the rear of the ladder rack 12, with a cam arm 74 which engages and lifts the boom arm 56 adjacent its connection with the boom 22. This action raises the boom high enough to assemble the pin 28 in its lower end with the hole 30 in the trailer hitch frame 32.

The operation of our lifting attachment is as follows. The boom 22 is transported by the pickup truck 14 disposed in a generally horizontal position on the ladder rack 12. The boom rests on the boom support frame 24 and is held in place by the sleeve 60 and the forward mounting guide 70 (see FIG. 4).

To place the boom 22 in its generally vertical, lifting position, the boom is first moved rearwardly on the boom support frame 24 by turning the hand crank 66 to drive the chain 62 over the pulleys 64. When the boom is sufficiently rearward of the ladder rack 12, the weight of its lower end 26 causes it to pivot into a generally vertical position, pivoting about the boom arm connection 58.

With the boom 22 in this position the pin 28 on the lower end 26 is engaged with the hole 30 of the trailer hitch frame 32 to secure it to the truck (see FIG. 5). Manual operation of the cam level 72 to engage the rearward end of the boom support frame 24 raises the boom for insertion of the pin 28 in the hole 30, and prevents any binding of the boom arm 56 with the rearward end of the boom support frame 24. Further rearward movement of the boom arm 56 will tilt the upper end 38 of the boom away from the rear of the truck (see FIG. 1). This movement is utilized to place the load in position for easy unloading when the lift carriage 34 is carried to the top of the boom and is limited, of course, to prevent tilting to a degree which would tip the vehicle or risk loss of a load off the lift carriage 34.

To effectuate lifting, the lift carriage 34 is placed at its lowestmost position by operation of the winch 39. The lifting platform is disposed horizontally on the lift carriage and a load applied. The load is then carried to the upper end 38 of the boom by operation of the winch 39, where the load is removed, after further tilting of the boom as explained above.

This procedure is substantially reversed to return the lift carriage 34 to its lowermost position and the boom to its stowed position, horizontally on the ladder rack.

From this detailed description of a preferred embodiment of our invention it will be understood that we have provided a relatively inexpensive lifting attachment for lighter lifting jobs which is easy to operate and transport. More particularly, it will be understood that my invention can fulfill the advantages, and achieve the objects, heretofore attributed to it.

It should also be understood that although the preferred embodiment described in manually powered, it could be electrically or hydraulically powered.

It is also possible to form the boom as a member with a box shaped cross section, to attach the lower end of the boom to the ball of a trailer hitch rather than by inserting the pin 28 into the hole 30 provided for the ball, and to support the lifting platform 50 by means of retractable support arms rather than fixed support flanges 52.

We claim:

1. A lifting attachment for light weight vehicles comprising:

an elongated boom member having an upper end, a lower end and an intermediate pivot;

anchor means operatively associated with the lower end of said boom member and disposed to interconnect said boom member lower end with said vehicle chassis when said boom member is disposed in generally vertical lifting position;

carriage means operatively associated with said boom member and disposed to travel reciprocally with respect thereto;

load support means operatively associated with said carriage means and disposed to support a load to be lifted by said lifting attachment;

drive means interconnected with said boom member and said carriage means and disposed to move said carriage means reciprocally with respect to said boom member;

a boom stowing support frame on said vehicle disposed to receive and stow said boom member in a generally horizontal position on said vehicle; and boom transfer means operatively associated with said boom stowing support frame and interconnecting said vehicle and said boom member and operable to transfer said boom member from a generally horizontal stowed position on said boom stowing support frame to a generally vertical lifting position with the lower end of said boom member interconnected to said vehicle chassis through said anchor means, and back again, said boom transfer means including a boom support member having a pivot point engaged with said intermediate pivot and having means to move longitudinally on said stowing support frame to move said pivot point longitudinally with respect to said vehicle from a rearward position adjacent the rear end of said vehicle to a forward position substantially forward thereof.

2. A lifting attachment as described in claim 1, in which:

said boom stowing support frame includes a generally horizontal support platform disposed to extend in fore and aft alignment with said vehicle at a height above the vehicle;

said boom transfer means boom support member is an elongated boom support arm longitudinally disposed with respect to said boom stowing support frame and having an outer end pivotally connected with said boom member pivot point;

a boom support guide mounted on said boom stowing support frame and disposed to receive and support said boom support arm for reciprocal movement with respect thereto from a retracted position where said boom support arm outer end is substantially forward of the rearmost portion of said vehicle to an extended position where said boom support arm outer end is rearward of the rearmost portion of said vehicle thereby tilting the upper end of said boom member rearwardly away from the rear of said vehicle when said boom member lower end is interconnected to said vehicle chassis by said anchor means; and said boom member pivot point is positioned at a distance above said boom member lower end which is substantially equal to the vertical distances between the point of interconnection between said boom member lower end and said vehicle chassis, and the support platform of said boom stowing support frame.

3. A lifting attachment as described in claim 2, in which:

said boom transfer means further includes a boom support arm lift member mounted on said boom stowing support frame adjacent the outer end of said boom support arm and disposed upon actuation to lift said outer end in a generally vertical direction to facilitate interconnection of the lower end of said boom member with said vehicle by said anchor means, and boom transfer drive means interconnected between said boom support guide means and boom support arm and operable to reciprocally move said boom support arm in said boom support guide means.

4. A lifting attachment as described in claim 1, in which:

said boom stowing support frame includes a generally horizontal support platform disposed to extend in fore and aft alignment with said vehicle at a height above the vehicle; and said boom member pivot point is positioned at a distance above said boom member lower end which is substantially equal to the vertical distances between the point of interconnection between said boom member lower end and said vehicle chassis and the support platform of said boom stowing support frame.

5. A lifting attachment as described in claim 1, in which:

said boom transfer means boom support member is an elongated boom support arm longitudinally disposed with respect to said boom stowing support frame and having an outer end pivotally connected with said boom member pivot point; and a boom support guide mounted on said boom stowing support frame and disposed to receive and support said boom support arm for reciprocal movement with respect thereto from a retracted position where said boom support arm outer end is substantially forward of the rearmost portion of said vehicle to an extended position where said boom support arm outer end is rearward of the rearmost portion of said vehicle thereby tilting the upper end of said boom member rearwardly away from the rear of said vehicle when said boom member lower end is interconnected to said vehicle chassis by said anchor means.

6. A lifting attachment for a pickup truck having a ladder rack with a horizontal support bed extending longitudinally over the cab and bed of said truck and a trailer hitch member attached to the truck chassis and extending rearwardly outward from the rearmost portion of the truck bed, comprising:

an elongated boom member substantially the same length as said truck and having an upper end and a lower end;

anchor means operatively associated with the lower end of said boom member and disposed to interconnect the lower end of said boom member with said trailer hitch member;

a load carriage movably mounted on said boom member and movable reciprocally with respect thereto;

load carriage drive means interconnected with said load carriage and said boom member and operable to reciprocally move said load carriage with respect to said boom member;

a boom support member pivotally connected to said boom member at a pivot point intermediate the ends thereof;

attachment means coupling said boom support member to said bed, said attachment means including a boom support guide movably mounting said boom support member and boom support drive means operable to move said boom support member with respect to said ladder rack support bed and said boom member pivot point along a path from a retract position substantially forward of the rearmost portion of said truck and adjacent the horizontal plane of said ladder rack support bed with said boom member rested on said ladder rack support bed and substantially centered longitudinally with respect to said truck, to an extended position adjacent the rearmost portion of said truck with said boom member lower end mounted on said trailer hitch member by said anchor means and said boom member extending substantially vertically upward therefrom.

7. A lifting attachment as described in claim 6, in which:

said boom member pivot point is positioned at a distance from said boom member lower end which is substantially equal to the vertical distance from said trailer hitch means to the horizontal plane of said ladder rack support bed; and said path of travel of said boom member pivot point is generally horizontal and adjacent the horizontal plane of said ladder rack support bed.

8. A lifting attachment as described in claim 6, in which:

said anchor means includes a ball hitch mounted on said trailer hitch member and a ball socket on the lower end of said boom member; and said attachment means further includes a boom support lift mechanism disposed to lift said boom member vertically a distance sufficient to insert said ball hitch in said ball socket.

* * * * *